Oct. 14, 1958 W. PFLAUM 2,855,908
METHOD OF COMBUSTION AND INTERNAL COMBUSTION ENGINES
Filed May 20, 1955 4 Sheets-Sheet 1

INVENTOR
WALTER PFLAUM
BY Dicke and Craig
ATTORNEYS.

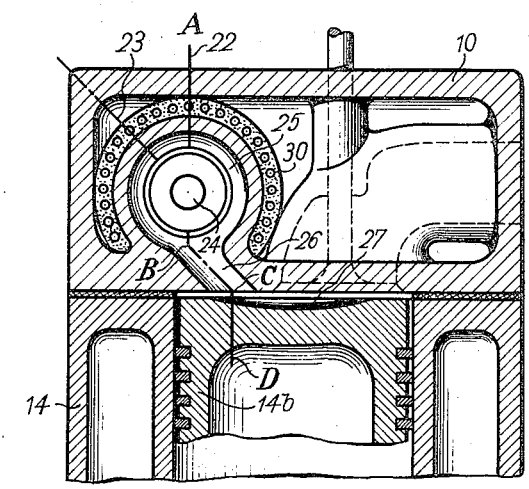
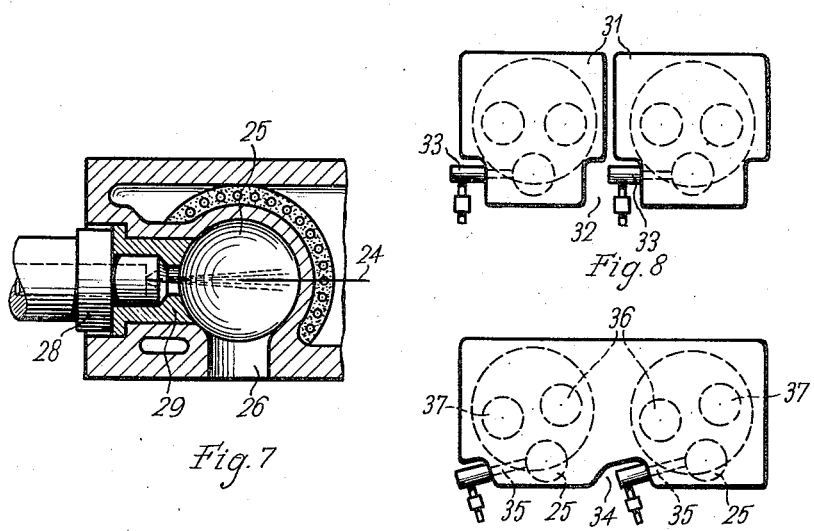

Oct. 14, 1958 W. PFLAUM 2,855,908
METHOD OF COMBUSTION AND INTERNAL COMBUSTION ENGINES
Filed May 20, 1955 4 Sheets-Sheet 4

INVENTOR

WALTER PFLAUM

BY *Dicke and Craig*

ATTORNEYS

United States Patent Office 2,855,908
Patented Oct. 14, 1958

2,855,908

METHOD OF COMBUSTION AND INTERNAL COMBUSTION ENGINES

Walter Pflaum, Berlin-Wannsee, Germany

Application May 20, 1955, Serial No. 509,901

Claims priority, application Germany May 25, 1954

22 Claims. (Cl. 123—32)

The present invention relates to an internal combustion engine in which the combustion chamber is subdivided into two or more chambers which may be used, for example, as a precombustion chamber or as a vortex chamber. When used as a precombustion chamber, the fuel will be injected and partially burned therein whereby the remainder of the fuel will be blown into the main combustion chamber so that the principal combustion will then be carried out therein at an increase in pressure. When used as a vortex chamber, all or nearly all of the combustion air will be forced into such chamber and revolved therein either by being supplied in a tangential direction or by any other suitable means, whereupon the fuel will then be injected into such revolving air current.

In either case, the most effective combustion is dependent upon the cooperation of several factors, the most important being the type or shape as well as the particular location of the fuel jet, the combustion chamber, and a possible vortex of fuel mixture or air as well as the temperatures within the combustion chamber and those of and along the walls of the combustion chamber. The mutual influence of these factors is so strong that a successful development can be assured only if their relation to each other by fully considered. Thus, for example, the ignition and the course of the combustion, and thus the movement of the air or gas is influenced by the temperature of the walls of the combustion chamber to such an extent that, for example, the fuel jet and the movement of the air must be differently dimensioned and adjusted in accordance with such temperature if the most suitable conditions in each particular case are to be obtained.

Accordingly, it is an object of the present invention to obtain a uniformly proper temperature in the combustion chamber, or of the air in that chamber or of the air admitted into such chamber.

A further object of the present invention is to provide suitable means for giving the combustion air a certain revolving movement, while other objects relate to a suitable injection of the fuel and to suitable means for controlling the temperature of the walls of the combustion chamber.

The means known prior to this invention for obtaining a certain temperature condition of the combustion chamber, for example, by the use of inserts, admit the most favorable condition to prevail only at a specific load of the engine while at other load conditions the wall temperature will be either too low or too high. This seriously affects the fuel combustion and thus the efficiency and output of the engine, its fuel consumption, the smokeless combustion of the fuel and the noise of the combustion.

It is therefore another object of the present invention to provide a new method and a new engine design which eliminates all the disadvantages of previous methods and designs, and balances the individual factors so harmoniously and favorably relative to each other that a fuel combustion will be achieved as uniform and advantageous as could not be obtained prior to this invention.

An essential feature of the invention therefore consists in the combination of means for giving the combustion air in the combustion chamber a revolving movement, in means for injecting the fuel into the revolving air current, preferably in a direction coaxial with that of the air vortex or parallel thereto, and in means for positively controlling the temperature of the walls of the combustion chamber in accordance with the respective prevailing operating or load conditions of the engine.

Further objects of the present invention consist in the provision of means for controlling the wall temperature of the combustion chamber in accordance with the speed of the engine, with the output or the torque of the engine, or the temperature of the engine itself.

A feature of the invention for attaining these objects consists in the provision of a thermo-responsive element, such as a thermostat, which may be mounted either within the cooling system of the engine, in the exhaust part thereof, or at any other suitable place and controls heating means associated with the wall of the combustion chamber.

Instead of, or aside from such heating means, the present invention also provides for the arrangement of cooling means, so that the walls of the combustion chamber may be partly heated and partly cooled, for example, in accordance with the prevailing load upon the engine.

For heating the walls of the combustion chamber the present invention provides, for example, for the use of electrical energy either in the form of a resistance wire, high-frequency current, or similar means, or of an external source of heat for a flowing heating medium which may be useful especially when starting the engine, or for the use of the cooling agent of the engine for such purpose. The flowing medium may also be either heated or cooled by chemical or mechanical means.

If the fuel is injected into the revolving and uniformly heated air, it meets relatively equal and equally favorable combustion conditions at all points of the combustion chamber so that with the production of a uniform mixture of air and fuel the best possible and most complete combustion will be obtained, which is realized at least partly by the fact that the fuel is brought into direct contact with the heated walls of the combustion chamber.

Another feature of the invention for producing the desired revolving movement of the air in the separated chamber consists in forming the passageway by means of inclined or helically shaped apertures, and in passing the fuel jet substantially in the axial direction of the air vortex. By this measure not only the air passing into the precombustion chamber but also the gases flowing out of such chamber will be given a spinning movement, a fact which also contributes to a further intimate mixture of the fuel and air and to render the combustion as complete as possible.

The inclined or helically shaped apertures forming the passageway according to the invention may be of equal size, form, or direction, or may differ in these respects from each other.

Further objects, features, and advantages of the present invention will be apparent from the following detailed description of several embodiments thereof as well as from the accompanying drawings, in which Fig. 1 shows an axial cross section through the upper part of an engine with a precombustion chamber according to the invention which is arranged laterally of the central axis of the cylinder;

Fig. 6 shows an axial cross section through the upper part of an engine with a vortex chamber arranged laterally of the engine;

Fig. 7 shows a section taken along line A—B—C—D of Fig. 6;

Fig. 8 shows a top view upon a multi-cylinder engine designed as shown in Figs. 6 and 7;

Fig. 9 shows a top view similar to Fig. 8 but of a modified engine construction; while

Figure 1:
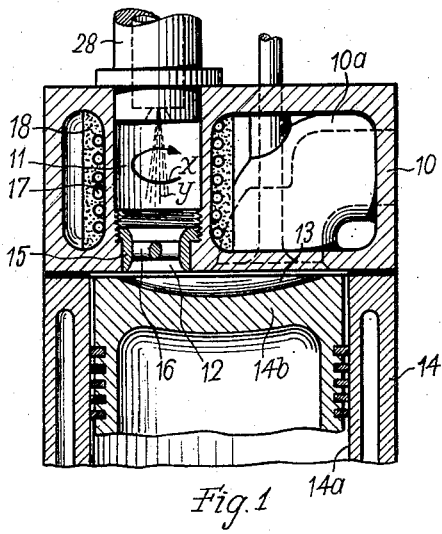

Referring to the drawings, and first particularly to Fig. 1, the cylinder head 10 is provided with a separate precombustion chamber 11 which is disposed laterally of the central axis of the cylinder.

The channel 12 connecting the precombustion chamber 11 with the main combustion chamber 13 and located above the piston 14b which is adapted to reciprocate upwardly and downwardly in the cylinder 14a of the engine housing is formed by an insert 15, the individual passage openings 16 of which are inclined or of helical shape so as to produce a revolving movement of the combustion air flowing into the precombustion chamber 11 in the direction as shown by the arrow x and about the axis y of the fuel jet passing through the injection nozzle 28.

Such revolving movement produces the further effect that the fuel will by centrifugal action be carried toward and against the wall of the combustion chamber, the fuel thus being affected directly by the temperature of the wall.

Figure 3B:
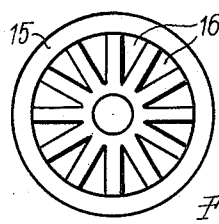
Fig. 3b shows an enlarged top view upon the insert forming the by-pass.
Figure 3A:
Fig. 3a shows an enlarged peripheral section through the passageway intermediate the cylinder and precombustion chambers in an unwound, flattened-out condition.
Figure 4B:
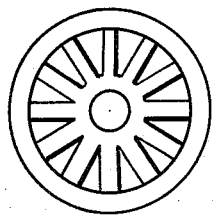
Figs. 4a and 4b show a modification of the passageway as shown in Figs. 3a and 3b.
Figure 4A:
Figure 5:
Fig. 5 shows another modification of the passageway.

The apertures 16 connecting the cylinder or main combustion chamber 13 with the precombustion chamber 11 may in this case be of equal dimensions, arrangement and direction, as illustrated in Figs. 3a and 3b. Depending upon the position of the precombustion chamber 11 relative to the main combustion chamber and the shape thereof, the distribution, shape and direction of the apertures along the periphery may be varied. Thus, for example, Figs. 4a and 4b show the passages 16a of unequal cross-sectional area which successively increases or decreases in the peripheral direction, while in the embodiment shown in Fig. 5, the cross-sectional area as well as the angular position of the individual passages 16b vary relative to each other. It is further within the purview of the invention to make the passages of different shapes in radial direction, and these changes may be applied either individually or in combination with each other. The passages may, for example, be distributed linearly over the periphery or such distribution may follow any other suitable prescription. Also, the axis of the passages which are disposed in a circular arrangement does not have to coincide with the axis of the precombustion chamber which for reason of a better intermixture is usually made to differ from the axis of the fuel jet. Finally, the passages may be arranged eccentrically, or in any other suitable manner, within the insert 15.

For producing a controlled temperature of the combustion chamber or the walls thereof, the precombustion chamber may for example, be surrounded by a coil 17 of electrical resistance wire, as shown in Fig. 1, which is protected from the influence of the cooling chamber 10a by insulating material 18. In place of resistance wire, the conduit may also consist of a tubular coil which may be supplied from the outside either with a heating or cooling medium. The flowing medium in such coil may also be heated or cooled by chemical or mechanical means. Also, the walls of the coil may cover the wall to be heated or cooled either entirely or only partly.

Figure 2:
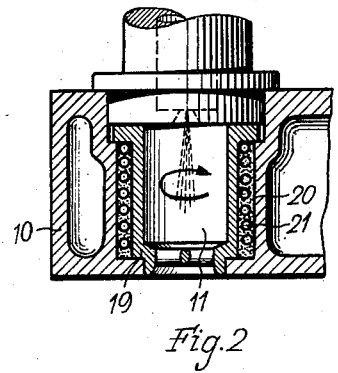
Fig. 2 shows a modification of the precombustion chamber and the heating device thereof.

Another embodiment of the invention is shown in Fig. 2, in which the precombustion chamber 11 is provided with a separate insert 19 which encloses the entire chamber and forms an intermediate space 20 in which an electrical resistance coil 21 or a tubular coil may be provided. A heat-insulating coating may then also be provided between the coil and the outer wall. However, in some cases it may be preferable to pass the heating or cooling medium directly, that is, without coils, through the intermediate space 20. While in the embodiments of the invention previously described the walls of the combustion chamber are heated or cooled by convection, the required temperature of the walls may also be obtained by direct heating by means of high-frequency currents.

In the event that the walls of the combustion chamber should not only be heated but under certain operating conditions also be cooled, coil 21 is preferably made of tubular shape so that at the required time a flowing cooling medium may be passed therethrough. A suitable combination of both heating and cooling actions may be obtained by heating the chamber walls electrically and by cooling them by hydraulical means. The wall surface generally allows sufficient space for mounting both systems thereon. Also, the same tubular coil if made of a suitable material may be used both for electrical resistance heating and for alternately conducting the flowing cooling medium therethrough. Either of these systems may obviously be applied to any of the embodiments of the invention.

The embodiments of the invention shown in Figs. 5 to 9 illustrate the application thereof to vortex chambers. In most vortex chamber engines of prior design, the fuel is injected transversally through the revolving air current, that is, substantially vertically to the axis of the vortex chamber, for example, in a direction as shown by the lines 22 and 23. The air currents thus intersect the fuel jet both at its upper and lower ends, or both at its point of discharge, as well as at its point of impact. This, however, renders the fuel distribution very uneven so that it is not possible to obtain the best possible intermixture of fuel and air and a maximum in output, and thus a minimum in fuel consumption. For this reason, the present invention provides for an injection of the fuel preferably in a direction of the axis 24 of the air vortex or parallel thereto, as illustrated, for example, in Figs. 6 and 7. The vortex chamber 25 is then connected with the main combustion chamber 27 by means of a passageway 26 which extends tangentially or substantially tangentially thereto. The injection nozzle 28 is preferably inserted into the socket 29 in a direction coaxially with the axis 24.

As described with respect to the first embodiment, a mixture of fuel and air will thus be obtained which may be regarded as the most thorough and complete as possible, and resulting primarily from the fact that because of the controlled temperature of the walls those fuel particles which are carried toward the walls of the combustion chamber will meet such a temperature condition as is most suitable for the desired most favorable combustion.

The vortex chamber may be either of spherical or any other suitable flattened shape. Also, it is of minor importance whether this chamber is formed in the cylinder head, in the cylinder itself, or in a separate intermediate portion or a separate fitting, provided the vortex can form therein of its own accord and exert itself in accordance with its kinetic energy.

Insofar as the heating is concerned, the same applies to the embodiment shown in Figs. 6 and 7 what has been said with regard to Figs. 1 and 2, so that no further explanation will be necessary. The heating coil 30 may, for example, be designed as shown in Fig. 1 and be embedded in insulating material. However, the heating or cooling means to be provided may also be of any other suitable type.

Fig. 8 further illustrates an embodiment of the invention in which an area 32 is provided intermediate the individual cylinder heads 31, in which the injection nozzle 33 or the head thereof may be located, so that the injection nozzle may be easily removed without requiring any removal of the cylinder heads 31.

If the cylinder heads are of block-shape as shown, for example, in Fig. 9, it may in some cases be advisable to provide an aperture 34 so as to permit the injection valve 35 to be mounted at an inclined position and to extend along an inclined axis relative to the axis of the engine. The vortex chamber 25 is then preferably shifted relative to a transverse plane extending through the cylinder axis so that the axial directions of the vortex and the fuel jet will extend substantially parallel to each other. In such a case it may be advisable also to displace the inlet and the outlet valves 36 and 37 accordingly.

Figure 10:
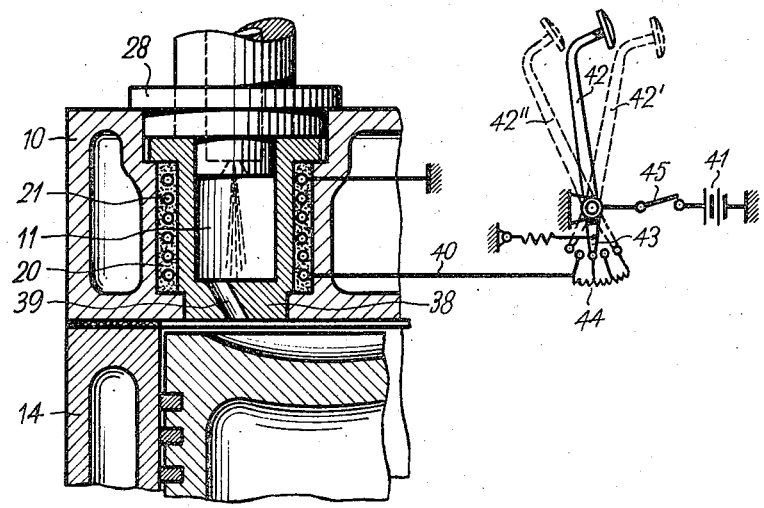
Fig. 10 shows still another modification of a precombustion chamber according to the invention including a wiring diagram of the heating system thereof controlled by a gas pedal.

In the embodiment of the invention as shown in Fig. 10, the precombustion chamber is designed substantially similar to the one shown in Fig. 2. However, the insert 38 forming the precombustion chamber is provided with one or more eccentrical passages 39 which may be disposed, for example, at an inclined angle both in a radial as well as in a peripheral direction. Such inclination will of itself give the air flowing into the precombustion chamber a revolving movement about the axis of the precombustion chamber or the injection nozzle 28. The heating coil 21 which, if desired, may also be combined with a cooling coil and be mounted in the annular space 29, may be connected to an electrical circuit 40 which may be supplied with current from a source of current 41 and controlled, for example, by the gas pedal 42 by means of a control arm 43 and a variable resistance 44 or the like. Such control action may proceed, for example, in such a manner that, when the engine is idling, that is, with the pedal in the position 42', the heating effect will be the strongest, while when the pedal is fully depressed and in the position 42'', the heating effect will be the lowest. Near the latter position when the output of the engine is the highest, the heating action may also be interrupted or be replaced by a supplementary cooling action. The heating system and its controls may also be of different design if so required by the respective engine and its use. A suitable switch 45 may also be provided to switch off the heating system entirely.

Figure 11:
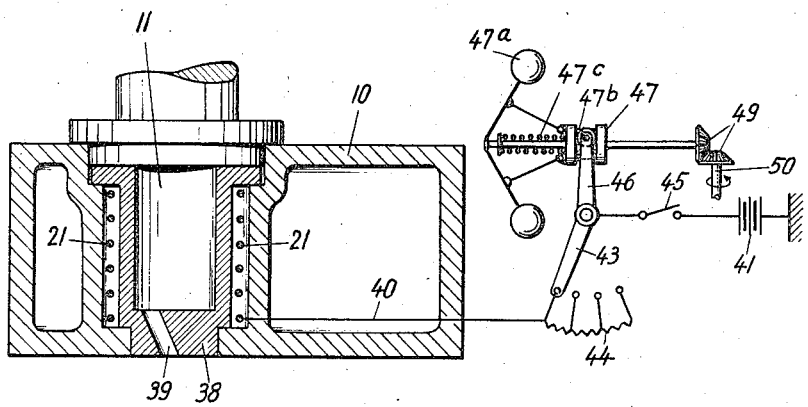
Figs. 11 and 12 illustrate a control of the heating system of Fig. 10 by other means.

In place of using the gas pedal 42 for operating the control arm 43, the latter may also be actuated by a centrifugal governor as shown in Figure 11. In this embodiment the current supplied to the heating coil 21 from a source 41 is controlled by a speed governor 47 that may be driven by the crankshaft or the cam shaft of the engine through an intermediate shaft 50 and a set of gears 49. As the speed of the engine increases the fly weights 47a move the collar 47b to the left in Figure 11 against the tension of the spring 47c whereby the control arm 46, 43 is being rotated in a counterclockwise direction. As a result of this movement, the resistance 44 is increased and the current supplied to the heating coil 21 is decreased so that with increased engine speed the heat supplied to the walls of the precombustion chamber by the heating coil 21 decreases correspondingly.

Figure 12:
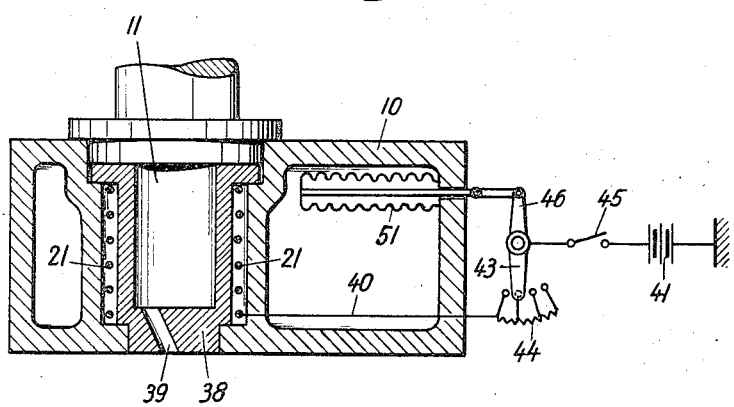

In the embodiment according to Figure 12, control arm 46, 43 is connected to a thermostat 51 which is actuated in response to the temperature of the engine cooling water. As the temperature of the coolant increases, the control arm 43, 46 is rotated in a counterclockwise direction whereby the resistance 44 is increased and the current to the heating coil 21 is correspondingly decreased. Such control mechanisms as described with respect to Figures 10, 11 and 12 may also be applied to any of the other embodiments previously described.

The present invention is not limited to precombustion or vortex chambers but may also be applied to any other type of separate or subdivided combustion chambers. Thus, the particular type of air vortex as well as the heating and temperature control system for the walls of the combustion chamber is useful in all types of engines where uniform heating or cooling of the air will have a combustion-promoting influence, irrespective of whether or not the fuel is injected directly into the heated combustion chamber. The rotary movement of the air as produced by the present invention is also applicable and of particular advantage not only for the passage of the air into the separate combustion chamber but also for the discharge thereof insofar as a better mixture will thus be obtained, as well as for a continuation and completion of the mixing process and the combustion in the main combustion chamber. Thus, the method according to the present invention will also be applicable in all those cases where not any, or only a weak partial combustion occurs in the separate chamber.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. A method of combustion for internal combustion engines having a combustion chamber separate from the cylinder chamber, and separate means in heat exchange relationship with said combustion chamber to vary the temperature thereof, comprising the steps of positively controlling the temperature of said combustion chamber by selectively adjusting the flow of heat to and from said combustion chamber and said means in accordance with a varying operating value of the engine to establish a predetermined temperature condition of said chamber over the entire operating range of said engine, and imparting a rotary movement to the air in the separate combustion chamber, whereby the air assumes a certain temperature, and injecting the fuel into the revolving air.

2. A method of combustion as defined in claim 1, wherein said operating value of the engine constitutes the speed of rotation of said engine.

3. A method of combustion as defined in claim 1, wherein said operating value of the engine constitutes the output thereof.

4. A method of combustion as defined in claim 1, wherein said operating value of the engine constitutes the temperature of said engine.

5. A method of combustion as defined in claim 1, wherein the temperature of the combustion chamber is controlled by supplementary heating of the same.

6. A method of combustion as defined in claim 1, wherein the temperature of the combustion chamber is controlled partly by supplementary heating and partly by supplementary cooling of the same.

7. A method of combustion as defined in claim 1, wherein the combustion chamber is supplementarily heated both when the engine is started and during the operation thereof.

8. A method of combustion for internal combustion engines having an air cell separate from the combustion chamber, and separate means in heat exchange relationship with said cell to vary the temperature thereof comprising the steps of positively controlling the temperature of said air cell by selectively adjusting the flow of heat to and from said cell and said means, and simultaneously imparting a rotary motion to the air in said air cell.

9. An internal combustion engine comprising an engine housing having a cylinder chamber therein, a piston adapted to reciprocate in said cylinder chamber, a combustion chamber having a wall separating the same from said cylinder chamber but being connected therewith, separate means in heat exchange relationship with said combustion chamber to vary the temperature thereof, means for positively controlling the temperature of said combustion chamber by selectively adjusting the flow of heat to and from said combustion chamber and said heat exchange means in accordance with a varying operating value of said engine to establish a predetermined temperature condition of said chamber over the entire load range of said engine, and means for producing a rotary movement of the air within said combustion chamber, means for injecting fuel into the rotating air.

10. An internal combustion engine as defined in claim 9, wherein said means for producing a rotary movement of the air within said combustion chamber comprise a passage connecting said cylinder and combustion chambers, said passage terminating into said combustion chamber tangentially thereto.

11. An internal combustion engine as defined in claim 9, wherein said means for producing a rotary movement of the air within said combustion chamber comprise a plurality of passages connecting said cylinder and combustion chambers, said passages being inclined relative to said combustion chamber in a direction so as to exert a spinning force upon the air as it flows into said combustion chamber.

12. An internal combustion engine as defined in claim 11, wherein the inclination of said passages varies relative to said combustion chamber.

13. An internal combustion engine as defined in claim 11, wherein said connecting passages are of different size.

14. An internal combustion engine as defined in claim 9, wherein said means for injecting fuel into said combustion chamber comprise an injection nozzle having a central axis extending substantially in the same direction as the central axis of the air vortex within said combustion chamber.

15. An internal combustion engine comprising an engine housing having a cylinder chamber therein, a piston adapted to reciprocate in said cylinder chamber, a combustion chamber having a wall separating the same from said cylinder chamber but being connected therewith, a cooling jacket around said combustion chamber, means for producing a rotary movement of the air within said combustion chamber, temperature control means intermediate said combustion chamber and said cooling jacket for selectively adjusting the flow of heat to and from said combustion chamber, and insulating means for insulating said temperature control means from said cooling jacket.

16. An internal combustion engine comprising an engine housing having a cylinder chamber therein, a piston adapted to reciprocate in said cylinder, a chamber separate from said cylinder chamber but being connected therewith, a cooling jacket having walls separating the same from said cylinder chamber and said separate chamber, an insert mounted in said separate chamber, and forming a combustion chamber, said insert with the wall of said cooling jacket forming an insulating chamber and having a passage therein connecting said combustion chamber with said cylinder chamber, said passage being shaped so that the air flowing from said cylinder chamber through said passage into said combustion chamber will be rotated within said combustion chamber, and heat exchange means within said insulating chamber for positively controlling the temperature of said combustion chamber by selectively adjusting the flow of heat to and from said combustion chamber and said heat exchange means to establish a predetermined temperature condition of said combustion chamber.

17. An internal combustion engine as defined in claim 16, wherein said heat exchange means comprise electrical heating means.

18. An internal combustion engine as defined in claim 9, wherein the wall of said combustion chamber is heated directly by means of electric high frequency currents.

19. An internal combustion engine as defined in claim 9, wherein said heat exchange means includes heating means and cooling means provided with a hydraulic medium for partly cooling the wall of said combustion chamber, said heating means comprising electrical heating means, and said cooling means comprising conduit means for the hydraulic medium.

20. An internal combustion engine as defined in claim 19, wherein said heating and cooling means comprise a tubular coil around said combustion chamber, said tubular coil being adapted to serve as an electrical resistance element and also to conduct a cooling agent therethrough.

21. An internal combustion engine comprising an engine housing having a plurality of cylinders therein, and a combustion chamber for each of said cylinders and separate therefrom, each of said combustion chambers being axially displaced relative to a vertical plane containing the axis of the respective cylinder belonging thereto, means for producing a rotary movement of the air within each combustion chamber so that the axis of the air vortex thus formed extends substantially parallel with said vertical plane, separate means in heat exchange relationship with the walls of said combustion chamber to vary the temperature thereof by selectively adjusting the flow of heat to and from said combustion chamber and said means, and an injection nozzle extending into each of said combustion chambers, each of said nozzles being substantially parallel with said plane and extending substantially in the direction of said vortex axis.

22. An internal combustion engine as defined in claim 21, wherein recesses are provided on the sides of said engine housing, said housing having openings therein for receiving said injection nozzles, said opening being disposed within said recesses.

References Cited in the file of this patent

FOREIGN PATENTS

| | | |
|---|---|---|
| 143,549 | Austria | Nov. 11, 1935 |
| 145,115 | Austria | Apr. 10, 1936 |
| 442,340 | Great Britain | Feb. 6, 1936 |